(12) United States Patent
Bian et al.

(10) Patent No.: US 12,549,006 B2
(45) Date of Patent: Feb. 10, 2026

(54) LOAD PREDICTION METHOD AND APPARATUS, ELECTRONIC DEVICE AND STORAGE MEDIUM

(71) Applicant: BEIJING BAIDU NETCOM SCIENCE TECHNOLOGY CO., LTD., Beijing (CN)

(72) Inventors: Chuanxin Bian, Beijing (CN); Yue Sun, Beijing (CN); Ye Zhang, Beijing (CN)

(73) Assignee: BEIJING BAIDU NETCOM SCIENCE TECHNOLOGY CO., LTD., Beijing (CN)

( * ) Notice: Subject to any disclaimer, the term of this patent is extended or adjusted under 35 U.S.C. 154(b) by 401 days.

(21) Appl. No.: 18/108,716

(22) Filed: Feb. 13, 2023

(65) Prior Publication Data
US 2023/0283073 A1 Sep. 7, 2023

(30) Foreign Application Priority Data
Mar. 2, 2022 (CN) .......................... 202210200042.4

(51) Int. Cl.
*H02J 3/00* (2006.01)
*G06N 20/00* (2019.01)
(52) U.S. Cl.
CPC .............. *H02J 3/003* (2020.01); *G06N 20/00* (2019.01)
(58) Field of Classification Search
CPC .......... H02J 3/003; G06N 20/00; Y04S 10/50; G06Q 10/04; G06Q 50/06
See application file for complete search history.

(56) References Cited

U.S. PATENT DOCUMENTS

| 2016/0054018 | A1* | 2/2016 | Motodani | F24F 11/46 700/276 |
|---|---|---|---|---|
| 2018/0195755 | A1* | 7/2018 | Nishida | G06Q 10/08 |
| 2018/0313557 | A1* | 11/2018 | Turney | G05B 13/048 |
| 2021/0302044 | A1* | 9/2021 | Sato | F24F 11/46 |

(Continued)

FOREIGN PATENT DOCUMENTS

| AU | 20200104000 A4 | 2/2021 |
|---|---|---|
| CN | 104376367 A | 2/2015 |
| CN | 104794547 A | 7/2015 |

(Continued)

OTHER PUBLICATIONS

Notice of Reasons for Refusal of Japanese patent application No. issued Aug. 1, 2023, 6 pages.
Decision to Grant a Patent of Japanese patent application No. issued Oct. 31, 2023, 2 pages.
Li et al., Based on Big Data Platform, Point Load Near and Medium Term Load Forecast and Industry Load Growth Characteristics Analysis, Power Systems and Big Data, Big Data Special Reports, vol. 23, No. 2, Feb. 2020, (with Abstract), 9 pages.

(Continued)

*Primary Examiner* — Ziaul Karim
(74) *Attorney, Agent, or Firm* — Brooks Kushman P.C.

(57) ABSTRACT

A load prediction method includes determining for a current prediction time point of a prediction day, a similar days of a prediction day from historical days before the prediction day; acquiring an air temperature difference between an air temperature at the time point of the prediction day and an air temperature at the time point of the similar day; determining a difference of loads at the time point of the prediction day and the similar day according to the air temperature difference; and determining a predicted load value at the time point of the prediction day according to a load value at the time point of the similar day and the load difference.

17 Claims, 3 Drawing Sheets

(56) References Cited

U.S. PATENT DOCUMENTS

2022/0101097 A1\* 3/2022 Liu .................. G06N 20/10

FOREIGN PATENT DOCUMENTS

| CN | 109002937 | A | 12/2018 |
| --- | --- | --- | --- |
| CN | 109190856 | A | 1/2019 |
| CN | 109886567 | A | 6/2019 |
| CN | 111598303 | A | 8/2020 |
| CN | 112396207 | A | 2/2021 |
| CN | 112561207 | A | 3/2021 |
| CN | 113947007 | A | 1/2022 |
| CN | 115438832 | A | 12/2022 |
| JP | H0538051 | A | 2/1993 |
| JP | 2005275558 | A | 10/2005 |
| JP | 2010204833 | A | 9/2010 |
| JP | 2012205385 | A | 10/2012 |
| JP | 2015033203 | A | 2/2015 |
| JP | 2016019358 | A | 2/2016 |
| JP | 2021039739 | A | 3/2021 |
| KR | 20210120938 | A | 10/2021 |

OTHER PUBLICATIONS

Notice of Allowance of Korean patent application No. KR 20220101140 dated Sep. 2, 2024, 4 pages.

Zheng Xian, A Relationship between Daily Load and Meteorological Factors for Guilin Power Network and Forecasting, Oct. 2008, vol. 34 No. 8, Meteorological Monthly.

Yang Jing, Relationship of Power Load and Weather in Agricultural Region of Xingjiang, Jan. 2009, vol. 35 No. 1, Meteorological Monthly.

Liu Mengliang, Short Term Load Forecasting Using Wavelet Transform and SVM Based on Similar-Days, Nov. 2006, vol. 21 No. 11, Transactions of China Electrotechnical Society.

Notice of Allowance for Chinese Application No. 202210200042.4, dated Jan. 20, 2024, 15 Pages including English Translation.

Request for the Submission of an Opinion of Korean patent application No. 10-2022-0101140 issued Apr. 1, 2024, 5 pages.

\* cited by examiner

LOAD PREDICTION METHOD AND APPARATUS, ELECTRONIC DEVICE AND STORAGE MEDIUM

CROSS-REFERENCE TO RELATED APPLICATIONS

The present disclosure claims the priority and benefit of Chinese Patent Application No. 202210200042.4, filed on Mar. 2, 2022, entitled "LOAD PREDICTION METHOD AND APPARATUS, ELECTRONIC DEVICE AND STORAGE MEDIUM." The disclosure of the above application is incorporated herein by reference in its entirety.

TECHNICAL FIELD

The present disclosure relates to the field of artificial intelligence technologies, particularly to the fields of deep learning, industrial big data, etc., and more particularly to a load prediction method and apparatus, an electronic device and a storage medium.

BACKGROUND

Load prediction is an important work of a power system dispatching operation department, and accurate load prediction may provide important help for unit starting and stopping, economic dispatch, load management, or the like.

Currently, load prediction is usually performed using a pre-trained prediction model; that is, factors affecting a load prediction result are input into the prediction model to obtain an output prediction result, but accuracy of this method is required to be improved.

SUMMARY

The present disclosure provides a load prediction method, an electronic device and a storage medium.

A load prediction method includes determining, for a current prediction time point of a prediction day, a similar day of the prediction day from historical days before the prediction day; acquiring an air temperature difference between an air temperature at the time point of the prediction day and an air temperature at the time point of the similar day; determining a difference of loads at the time point of the prediction day and the similar day according to the air temperature difference; and determining a predicted load value at the time point of the prediction day according to a load value at the time point of the similar day and the load difference.

An electronic device includes at least one processor; and a memory connected with the at least one processor communicatively; wherein the memory stores instructions executable by the at least one processor to enable the at least one processor to perform the method as mentioned above.

There is provided a non-transitory computer readable storage medium with computer instructions stored thereon, wherein the computer instructions are used for causing a computer to perform the method as mentioned above.

It should be understood that the statements in this section are not intended to identify key or critical features of the embodiments of the present disclosure, nor limit the scope of the present disclosure. Other features of the present disclosure will become apparent from the following description.

BRIEF DESCRIPTION OF THE DRAWINGS

The drawings are used for better understanding the present solution and do not constitute a limitation of the present disclosure. In the drawings.

DETAILED DESCRIPTION OF EMBODIMENTS

The following part will illustrate exemplary embodiments of the present disclosure with reference to the drawings, including various details of the embodiments of the present disclosure for a better understanding. The embodiments should be regarded only as exemplary ones. Therefore, those skilled in the art should appreciate that various changes or modifications can be made with respect to the embodiments described herein without departing from the scope and spirit of the present disclosure. Similarly, for clarity and conciseness, the descriptions of the known functions and structures are omitted in the descriptions below.

In addition, it should be understood that the term "and/or" only describes an association relationship between associated objects, and indicates that three relationships may exist. For example, A and/or B may indicate three cases: only A exists; both A and B exist; and only B exists. In addition, in this specification, the symbol "/" generally indicates that associated objects have a relationship of "or".

Figure 1:
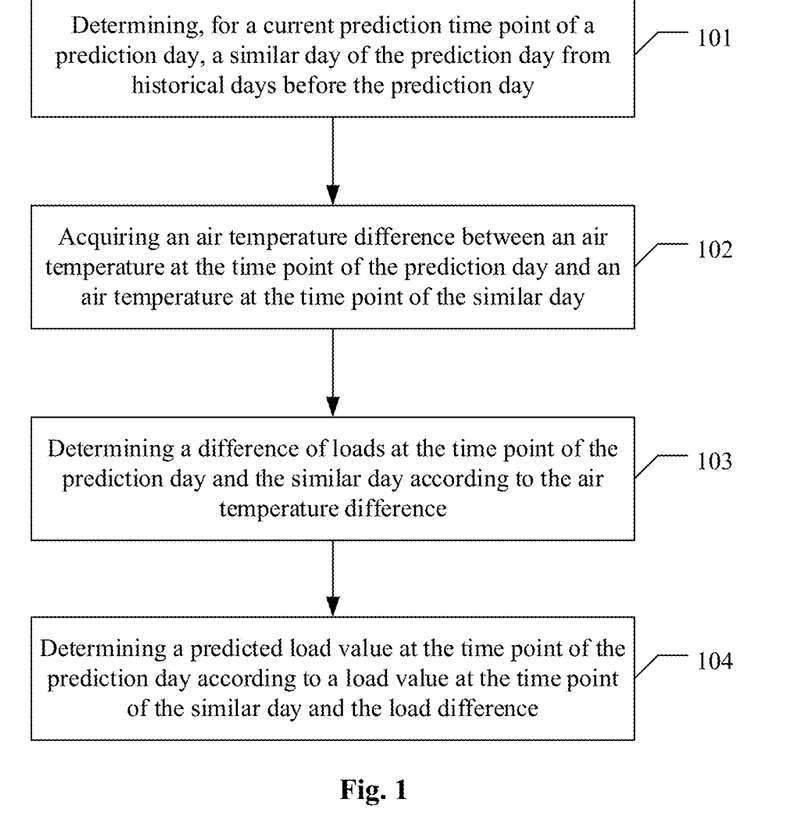
FIG. 1 is a flow chart of a load prediction method according to an embodiment of the present disclosure.

FIG. 1 is a flow chart of a load prediction method according to an embodiment of the present disclosure. As shown in FIG. 1, the method includes the following implementation steps:

step 101: determining, for a current prediction time point of a prediction day, a similar day of the prediction day from historical days before the prediction day;

step 102: acquiring an air temperature difference between an air temperature at the time point of the prediction day and an air temperature at the time point of the similar day;

step 103: determining a difference of loads at the time point of the prediction day and the similar day according to the air temperature difference; and step 104: determining a predicted load value at the time point of the prediction day according to a load value at the time point of the similar day and the load difference.

Load prediction is affected by many factors among which the air temperature is a factor having a greatest influence on precision of load prediction; in the solution of the above method embodiment, for a prediction time point, the difference of the air temperatures at the time point of the prediction day and the time point of the similar day of the prediction day may be acquired, and the predicted load value at the time point may be determined in conjunction with the load value at the time point of the similar day and the difference of the loads at the time point of the prediction day and the similar day determined according to the air temperature difference, thereby improving accuracy of a prediction result.

The load prediction method according to the present disclosure is particularly applied to load prediction in high-temperature weather, and the high-temperature weather may be weather with the highest air temperature greater than 30° C.

For each prediction day, a plurality of prediction time points may be set, these time points may be evenly distributed on a time axis of 24 hours in one day, and for each time point, processing operations may be performed according to the method in the embodiment shown in FIG. 1.

Specifically, for a current prediction time point of the prediction day, a similar day of the prediction day may be first determined from historical days before the prediction day.

In one embodiment of the present disclosure, closest N historical days may be used as candidate days, a feature vector corresponding to the prediction day and feature vectors corresponding to the candidate days may be acquired, and N is a positive integer greater than one; then, Euclidean distances between the prediction day and the candidate days may be determined according to the feature vectors, and then, the candidate days may be ranked in an ascending order of the Euclidean distances, and Top K candidate days after ranking may be used as the similar days of the prediction day; that is, the Top K closest days may be selected as the similar days of the prediction day according to the Euclidean distances, and K is a positive integer and is less than N.

Specific values of K and N may be determined according to actual requirements, and usually, during actual prediction, the value of K is 1; that is, the first candidate day after ranking may be used as the similar day of the prediction day.

Assuming that the value of N is 30, for convenience of expression, 30 candidate days are called candidate days 1 to 30 respectively, the feature vectors corresponding to the prediction day and the candidate days 1 to 30 may be then acquired, the Euclidean distance between the prediction day and the candidate day 1 may be determined according to the feature vector corresponding to the prediction day and the feature vector corresponding to the candidate day 1, the Euclidean distance between the prediction day and the candidate day 2 may be determined according to the feature vector corresponding to the prediction day and the feature vector corresponding to the candidate day 2, . . . , the Euclidean distance between the prediction day and the candidate day 30 may be determined according to the feature vector corresponding to the prediction day and the feature vector corresponding to the candidate day 30, and the candidate day with the smallest Euclidean distance may be used as the similar day of the prediction day.

With the above processing operation, the similar day of the prediction day may be accurately and efficiently screened, such that a good foundation is laid for subsequent processing operations.

In one embodiment of the present disclosure, the feature vectors may include: feature vectors generated in conjunction with predetermined M factors which influence the load prediction result, M is a positive integer greater than one, and the air temperature is not included in the M factors.

A specific value of M may be determined according to actual requirements, and the specific M factors may also be determined according to actual requirements.

Load prediction is influenced by many factors, such as holiday judgment (whether a day is a holiday), time period information, an air temperature, or the like. Correspondingly, the feature vectors may be generated according to the holiday judgment, the time period information, or the like, other than the air temperature; for example, the holiday judgment may be converted into a corresponding vector representation in a predetermined manner, the time period information may be converted into a corresponding vector representation in a predetermined manner, and then, the vector representations may be spliced in a predetermined order to obtain the required feature vectors.

The holiday judgment may include a holiday result (Yes) and a non-holiday result (No), and the time period information may include the month, the day in one week, and other information, such as Tuesday (second day).

Since air temperature information is not included in the feature vector, the selected similar day has strongest correlation with the prediction day except for the air temperature factor, and correspondingly, the load difference may be reflected by the air temperature difference.

After the similar day of the prediction day is determined, the air temperature difference between the air temperature at the prediction time point of the prediction day and the air temperature at the time point of the similar day may be acquired, and a method of acquiring air temperatures at different time points is not limited.

Further, the difference of the loads at the prediction time point of the prediction day and the similar day may be determined according to the air temperature difference. In one embodiment of the present disclosure, the difference of the loads at the time point of the prediction day and the similar day may be determined according to the air temperature difference and a regression equation corresponding to the time point.

Different time points may correspond to respective regression equations. In addition, a regression equation corresponding to each time point may be pre-determined.

In one embodiment of the present disclosure, the following processing operations may be performed for any time point: constructing P groups of data pairs, P being a positive integer greater than one, and any data pair including: a difference of air temperatures at the time point of a first historical day and a second historical day corresponding to the data pair, and a difference of loads at the time point of the first historical day and the second historical day, and the second historical day being a similar day of the first historical day; and then, determining the regression equation corresponding to the time point according to the P groups of data pairs.

For example, for a certain historical day, a similar day thereof may be determined first, and a determining method may be the same as the method of determining the similar day of the prediction day; it should be noted that, when the similar day of the prediction day is determined, usually, the first candidate day after ranking may be used as the similar day of the prediction day, and when the similar day of the historical day is determined, for example, top 10 candidate days after ranking may be used as the similar days of the historical day, so as to increase a number of the data pairs; correspondingly, for the historical day, 10 data pairs may be generated, and each data pair may correspond to the historical day (the first historical day) and one similar day (the second historical day) of the historical day.

As mentioned above, each data pair may include: the difference of the air temperatures at the time point of the first historical day and the second historical day corresponding to the data pair and the difference of the loads at the time point of the first historical day and the second historical day. An actual load value of the historical day is known, such that the difference of the loads at any time point of the first historical day and the second historical day may be conveniently acquired.

In addition, a week factor may also influence the load value, and in one embodiment of the present disclosure, for the ith day in a week, 1≤i≤7, a daily average load change curve of the ith day may be determined according to daily load change curves of L historical days, L is a positive integer greater than one, and the L historical days are all the ith days in weeks; correspondingly, the load value at the time point of the first historical day may be determined according to the daily average load change curve corresponding to the first historical day, the load value at the time point of the second historical day may be determined according to the daily average load change curve corresponding to the second historical day, a difference value between the two load values may be acquired, and the difference value is used as week compensation corresponding to the first historical day and the second historical day, such that the load difference in the data pair may be corrected using the week compensation.

For example, daily average load change curves of days in a week, i.e., a daily average load change curve of Monday (first day), a daily average load change curve of Tuesday (second day), a daily average load change curve of Wednesday (third day), a daily average load change curve of Thursday (fourth day), a daily average load change curve of Friday (fifth day), a daily average load change curve of Saturday (sixth day), and a daily average load change curve of Sunday (seventh day), may be determined based on historical days of last 8 weeks; with Monday as an example, 8 daily load change curves (actual load values) of Monday may be obtained, an average of the 8 daily load change curves may be calculated to obtain the daily average load change curve of Monday (first day), and the process is repeated.

Figure 2:
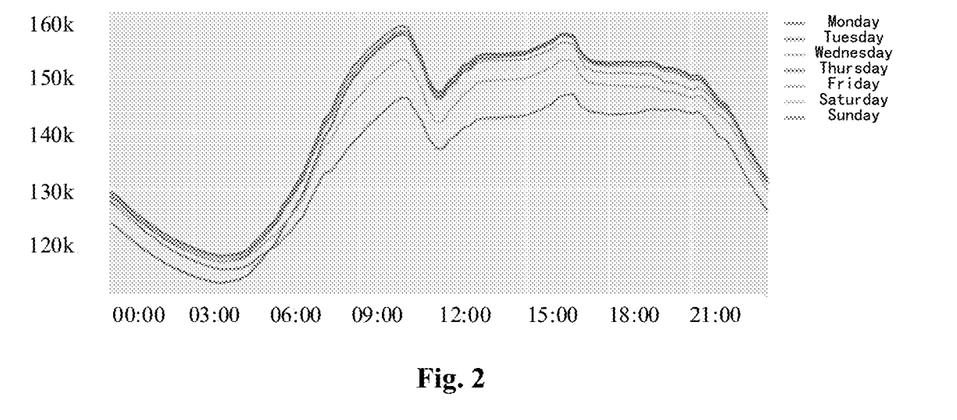
FIG. 2 is a schematic diagram of a daily average load change curve of each day in a week in the present disclosure.

FIG. 2 is a schematic diagram of the daily average load change curve of each day in a week in the present disclosure. As shown in FIG. 2, the horizontal axis represents time, and the vertical axis represents the load value.

Correspondingly, for any data pair at any time point, assuming that the first historical day is Friday, and the second historical day is Wednesday, the load value at the time point of the first historical day may be determined according to the daily average load change curve of Friday corresponding to the first historical day, the load value at the time point of the second historical day may be determined according to the daily average load change curve of Wednesday corresponding to the second historical day, a difference value between the two load values may be acquired, the difference value is used as week compensation corresponding to the first historical day and the second historical day, and the load difference in the data pair may be corrected using the week compensation. For example, if the load difference is A and the week compensation is B before correction in the data pair, A-B may be used as the corrected load difference.

With the above processing operations, other factors affecting load changes are separated as far as possible, such that the load difference is correlated with the air temperature as far as possible.

Figure 3:
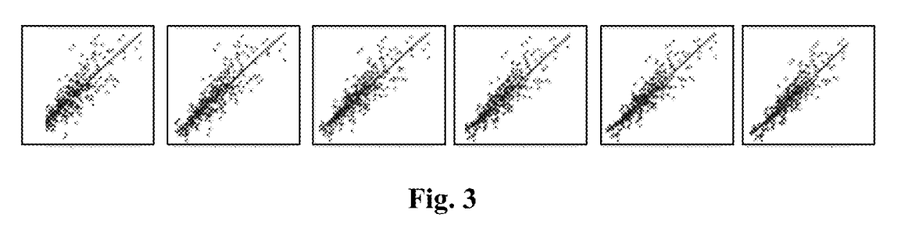
FIG. 3 is a scatter diagram and a schematic diagram of a linear fitting method in the present disclosure.

For any time point, after the P groups of data pairs are obtained, the regression equation corresponding to the time point may be determined according to the P groups of data pairs. In one embodiment of the present disclosure, a corresponding scatter diagram may be generated according to the P groups of data pairs, and then, linear fitting may be performed according to the scatter diagram, thereby obtaining the regression equation corresponding to the time point.

FIG. 3 is the scatter diagram and a schematic diagram of a linear fitting method in the present disclosure. As shown in FIG. 3, the horizontal axis represents the air temperature difference, and the vertical axis represents the load difference; in addition, FIG. 3 shows scatter diagrams corresponding to six different time points. Data pairs corresponding to any time point may be displayed in a scatter diagram, and linear fitting may be performed. From FIG. 3, there is a linear relationship between the load difference and the air temperature difference, and an intercept is zero. Linear fitting is performed on the scatter diagrams to obtain required regression equations corresponding to the time points.

Based on the regression equation, after the air temperature difference between the air temperature at the prediction time point of the prediction day and the air temperature at the time point of the similar day of the prediction day is acquired, the difference of the loads at the time point of the prediction day and the similar day of the prediction day may be determined according to the air temperature difference and the corresponding regression equation.

That is, by means of the regression equation, the difference of the loads at the time point of the prediction day and the similar day of the prediction day may be accurately and efficiently predicted.

Further, the predicted load value at the time point of the prediction day may be determined according to the load value at the prediction time point of the similar day of the prediction day and the difference of the loads at the time point of the prediction day and the similar day of the prediction day. For example, a sum of the load value at the time point of the similar day of the prediction day and the load difference may be calculated, and the calculation result may be used as the predicted load value at the time point of the prediction day.

In one embodiment of the present disclosure, week compensation corresponding to the prediction day and the similar day of the prediction day may also be acquired, the difference of the loads at the prediction time point of the prediction day and the similar day of the prediction day may be corrected using the acquired week compensation, and then, the predicted load value at the time point of the prediction day may be determined according to the load value at the prediction time point of the similar day of the prediction day and the corrected load difference.

The load value at the prediction time point of the prediction day may be determined according to a daily average load change curve corresponding to the prediction day, the load value at the time point of the similar day of the prediction day may be determined according to a daily average load change curve corresponding to the similar day of the prediction day, a difference value between the two load values may be acquired, the difference value is used as the week compensation corresponding to the prediction day and the similar day of the prediction day, and then, the difference of the loads at the time point of the prediction day and the similar day of the prediction day may be corrected using the week compensation.

Further, the predicted load value at the time point of the prediction day may be determined according to the load value at the time point of the similar day of the prediction day and the corrected load difference; for example, a sum of the load value at the time point of the similar day of the prediction day and the corrected load difference may be calculated, and the calculation result may be used as the predicted load value at the time point of the prediction day.

The difference of the loads at the time point of the prediction day and the similar day of the prediction day is corrected to further improve accuracy of the obtained load prediction value.

It should be noted that for simplicity of description, the above-mentioned embodiment of the method is described as combinations of a series of acts, but those skilled in the art should understand that the present disclosure is not limited by the described order of acts, as some steps may be performed in other orders or simultaneously according to the present disclosure. Further, those skilled in the art should also understand that the embodiments described in this specification are preferred embodiments and that acts and modules referred to are not necessary for the present disclosure.

In conclusion, the solution of the method embodiment of the present disclosure may improve the accuracy of the prediction result, thereby providing a data foundation for unit starting and stopping, economic dispatch, load management, or the like.

Figure 4:
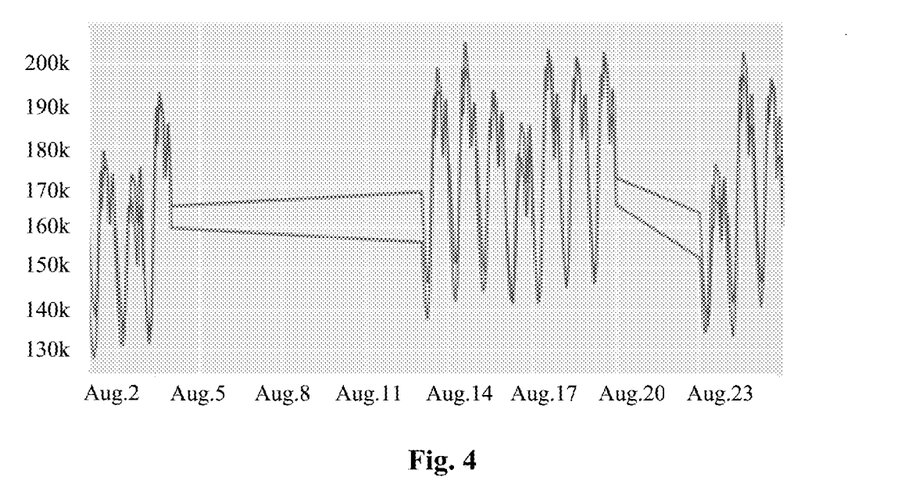
FIG. 4 is a schematic diagram of an effect of comparison between a predicted load value obtained by the method according to the present disclosure and an actual load value.

FIG. 4 is a schematic diagram of an effect of comparison between the predicted load value obtained by the method according to the present disclosure and an actual load value. As shown in FIG. 4, the horizontal axis represents a date, and the vertical axis represents the load value; assuming that only some high-temperature days in August are predicted, the upper curve represents the load prediction value, the lower curve represents the actual load value, it is observed that the predicted load value and the actual load value are quite close, which indicates that the prediction result is accurate.

The above is a description of an embodiment of the method, and an embodiment of an apparatus according to the present disclosure will be further described below.

Figure 5:
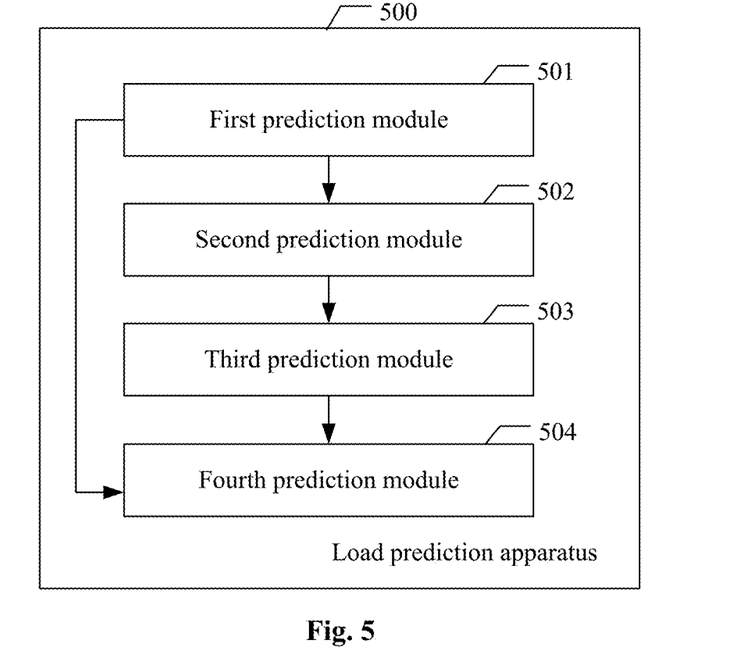
FIG. 5 is a schematic structural diagram of a load prediction apparatus 500 according to a first embodiment of the present disclosure.

FIG. 5 is a schematic structural diagram of a load prediction apparatus 500 according to a first embodiment of the present disclosure. As shown in FIG. 5, the load prediction apparatus includes a first prediction module 501 configured to determine for a current prediction time point of a prediction day, a similar day of the prediction day from historical days before the prediction day; a second prediction module 502 configured to acquire an air temperature difference between an air temperature at the time point of the prediction day and an air temperature at the time point of the similar day; a third prediction module 503 configured to determine a difference of loads at the time point of the prediction day and the similar day according to the air temperature difference; and a fourth prediction module 504 configured to determine a predicted load value at the time point of the prediction day according to a load value at the time point of the similar day and the load difference.

In the solution of the above apparatus embodiment, for the prediction time point, the difference of the air temperatures at the time point of the prediction day and the time point of the similar day of the prediction day may be acquired, and the predicted load value at the time point may be determined in conjunction with the load value at the time point of the similar day and the difference of the loads at the time point of the prediction day and the similar day determined according to the air temperature difference, thereby improving accuracy of a prediction result, or the like.

In one embodiment of the present disclosure, the first prediction module 501 may: use closest N historical days as candidate days; acquire a feature vector corresponding to the prediction day and feature vectors corresponding to the candidate days, N being a positive integer greater than one; then, determine Euclidean distances between the prediction day and the candidate days according to the feature vectors; and then, rank the candidate days in an ascending order of the Euclidean distances, and use Top K candidate days after ranking as the similar days of the prediction day, that is, select the Top K closest days as the similar days of the prediction day according to the Euclidean distances, K being a positive integer and being less than N.

Specific values of K and N may be determined according to actual requirements, and usually, during actual prediction, the value of K is 1; that is, the first candidate day after ranking may be used as the similar day of the prediction day.

In one embodiment of the present disclosure, the feature vectors may include: feature vectors generated in conjunction with predetermined M factors which influence the load prediction result, M is a positive integer greater than one, and the air temperature is not included in the M factors.

A specific value of M may be determined according to actual requirements, and the specific M factors may also be determined according to actual requirements.

After the similar day of the prediction day is determined, the second prediction module 502 may acquire the air temperature difference between the air temperature at the prediction time point of the prediction day and the air temperature at the time point of the similar day.

Further, the third prediction module 503 may determine the difference of the loads at the prediction time point of the prediction day and the similar day according to the air temperature difference. In one embodiment of the present disclosure, the third prediction module 503 may determine the difference of the loads at the time point of the prediction day and the similar day according to the air temperature difference and a regression equation corresponding to the time point.

Different time points may correspond to respective regression equations. In addition, a regression equation corresponding to each time point may be pre-determined.

The fourth prediction module 504 may determine the predicted load value at the time point of the prediction day according to the load value at the prediction time point of the similar day and the load difference.

Figure 6:
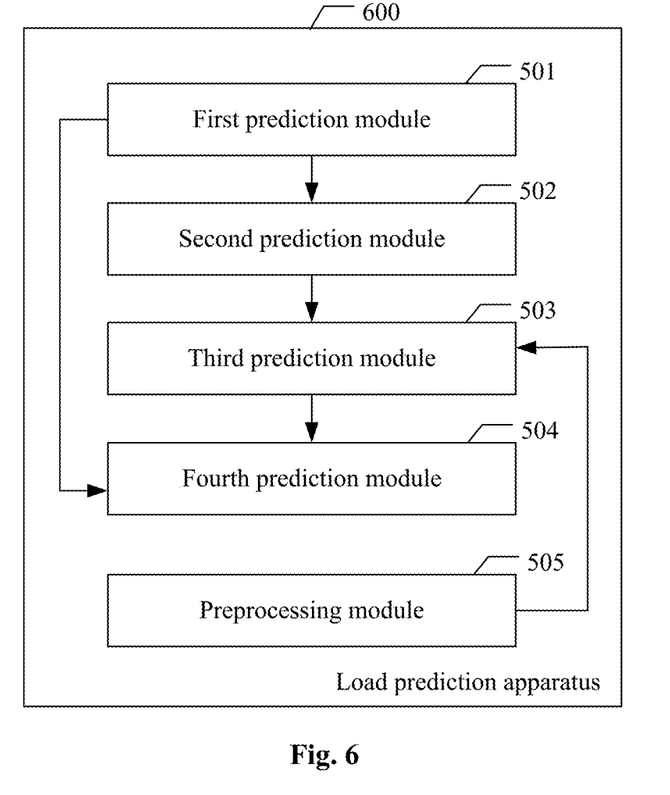
FIG. 6 is a schematic structural diagram of a load prediction apparatus 600 according to a second embodiment of the present disclosure.

FIG. 6 is a schematic structural diagram of a load prediction apparatus 600 according to a second embodiment of the present disclosure. As shown in FIG. 6, the load prediction apparatus includes a first prediction module 501, a second prediction module 502, a third prediction module 503, a fourth prediction module 504 and a preprocessing module 505.

The first prediction module 501, the second prediction module 502, the third prediction module 503 and the fourth prediction module 504 are the same as in the embodiment shown in FIG. 5.

The preprocessing module 505 may perform the following processing operations for any time point: constructing P groups of data pairs, P being a positive integer greater than one, and any data pair including: a difference of air temperatures at the time point of a first historical day and a second historical day corresponding to the data pair, and a difference of loads at the time point of the first historical day and the second historical day, and the second historical day being a similar day of the first historical day; and then, determining the regression equation corresponding to the time point according to the P groups of data pairs.

For example, for a certain historical day, a similar day thereof may be determined first, and a determining method may be the same as the method of determining the similar day of the prediction day; it should be noted that, when the similar day of the prediction day is determined, usually, the first candidate day after ranking may be used as the similar day of the prediction day, and when the similar day of the historical day is determined, for example, top 10 candidate days after ranking may be used as the similar days of the historical day, so as to increase a number of the data pairs; correspondingly, for the historical day, 10 data pairs may be generated, and each data pair may correspond to the historical day (the first historical day) and one similar day (the second historical day) of the historical day.

In addition, a week factor may also influence the load value, and in one embodiment of the present disclosure, the preprocessing module 505 may, for the ith day in a week, $1 \leq i \leq 7$ determine a daily average load change curve of the ith day according to daily load change curves of L historical days, L being a positive integer greater than one, and the L historical days being all the ith days in weeks; correspondingly, determine the load value at the time point of the first historical day according to the daily average load change curve corresponding to the first historical day, determine the load value at the time point of the second historical day according to the daily average load change curve corresponding to the second historical day, acquire a difference value between the two load values, use the difference value as week compensation corresponding to the first historical day and the second historical day, and then correct the load difference in the data pair using the week compensation.

For any time point, after the P groups of data pairs are obtained, the preprocessing module 505 may determine the regression equation corresponding to the time point according to the P groups of data pairs. In one embodiment of the present disclosure, the preprocessing module 505 may generate a corresponding scatter diagram according to the P groups of data pairs, and then perform linear fitting according to the scatter diagram to obtain the regression equation corresponding to the time point.

Based on the regression equation, after the air temperature difference between the air temperature at the prediction time point of the prediction day and the air temperature at the time point of the similar day of the prediction day is acquired, the third prediction module 503 may determine the difference of the loads at the time point of the prediction day and the similar day of the prediction day according to the air temperature difference.

Further, the fourth prediction module 504 may further acquire week compensation corresponding to the prediction day and the similar day of the prediction day, correct the difference of the loads at the prediction time point of the prediction day and the similar day of the prediction day using the acquired week compensation, and then determine the predicted load value at the time point of the prediction day according to the load value at the prediction time point of the similar day of the prediction day and the corrected load difference.

For the specific work flow of the embodiments of the apparatuses shown in FIGS. 5 and 6, reference is made to the related description in the foregoing embodiment of the method, and details are not repeated.

In conclusion, the solution of the apparatus embodiment of the present disclosure may improve the accuracy of the prediction result, thereby providing a data foundation for unit starting and stopping, economic dispatch, load management, or the like.

The solution of the present disclosure may be applied to the field of artificial intelligence, and particularly relates to the fields of deep learning, industrial big data, or the like. Artificial intelligence is a subject of researching how to cause a computer to simulate certain thought processes and intelligent behaviors (for example, learning, inferring, thinking, planning, or the like) of a human, and includes both hardware-level technologies and software-level technologies. Generally, the hardware technologies of the artificial intelligence include technologies, such as a sensor, a dedicated artificial intelligence chip, cloud computing, distributed storage, big data processing, or the like; the software technologies of the artificial intelligence mainly include a computer vision technology, a voice recognition technology, a natural language processing technology, a machine learning/deep learning technology, a big data processing technology, a knowledge graph technology, or the like.

In the technical solution of the present disclosure, the collection, storage, usage, processing, transmission, provision, disclosure, or the like, of involved user personal information are in compliance with relevant laws and regulations, and do not violate public order and good customs.

According to the embodiment of the present disclosure, there are also provided an electronic device, a readable storage medium and a computer program product.

Figure 7:
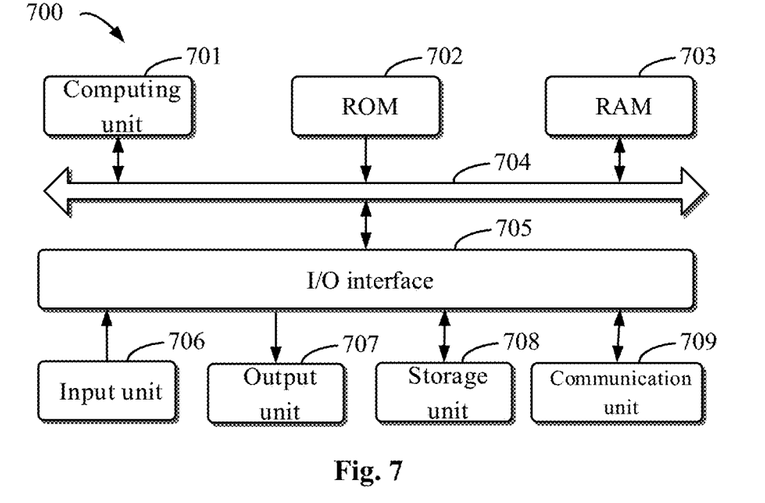
FIG. 7 shows a schematic block diagram of an electronic device 700 which may be configured to implement embodiments of the present disclosure.

FIG. 7 shows a schematic block diagram of an electronic device 700 which may be configured to implement the embodiments of the present disclosure. The electronic device is intended to represent various forms of digital computers, such as laptop computers, desktop computers, workstations, servers, blade servers, mainframe computers, and other appropriate computers. The electronic device may also represent various forms of mobile apparatuses, such as personal digital assistants, cellular telephones, smart phones, wearable devices, and other similar computing apparatuses. The components shown herein, their connections and relationships, and their functions, are meant to be exemplary only, and are not meant to limit implementation of the present disclosure described and/or claimed herein.

As shown in FIG. 7, the device 700 includes a computing unit 701 which may perform various appropriate actions and processing operations according to a computer program stored in a read only memory (ROM) 702 or a computer program loaded from a storage unit 708 into a random access memory (RAM) 703. Various programs and data necessary for the operation of the device 700 may be also stored in the RAM 703. The computing unit 701, the ROM 702, and the RAM 703 are connected with one other through a bus 704. An input/output (I/O) interface 705 is also connected to the bus 704.

The plural components in the device 700 are connected to the I/O interface 705, and include: an input unit 706, such as a keyboard, a mouse, or the like; an output unit 707, such as various types of displays, speakers, or the like; the storage unit 708, such as a magnetic disk, an optical disk, or the like; and a communication unit 709, such as a network card, a modem, a wireless communication transceiver, or the like. The communication unit 709 allows the device 700 to exchange information/data with other devices through a computer network, such as the Internet, and/or various telecommunication networks.

The computing unit 701 may be a variety of general and/or special purpose processing components with processing and computing capabilities. Some examples of the computing unit 701 include, but are not limited to, a central processing unit (CPU), a graphic processing unit (GPU), various dedicated artificial intelligence (AI) computing chips, various computing units running machine learning model algorithms, a digital signal processor (DSP), and any suitable processor, controller, microcontroller, or the like. The computing unit 701 performs the methods and processing operations described above, such as the method according to the present disclosure. For example, in some embodiments, the method according to the present disclosure may be implemented as a computer software program tangibly contained in a machine-readable medium, such as the storage unit 708. In some embodiments, part or all of the computer program may be loaded and/or installed into the device 700 via the ROM 702 and/or the communication unit 709. When the computer program is loaded into the RAM 703 and executed by the computing unit 701, one or more steps of the method according to the present disclosure may be performed. Alternatively, in other embodiments, the computing unit 701 may be configured to perform the method according to the present disclosure by any other suitable means (for example, by means of firmware).

Various implementations of the systems and technologies described herein above may be implemented in digital electronic circuitry, integrated circuitry, field programmable gate arrays (FPGA), application specific integrated circuits (ASIC), application specific standard products (ASSP), systems on chips (SOC), complex programmable logic devices (CPLD), computer hardware, firmware, software, and/or combinations thereof. The systems and technologies may be implemented in one or more computer programs which are executable and/or interpretable on a programmable system including at least one programmable processor, and the programmable processor may be special or general, and may receive data and instructions from, and transmit data and instructions to, a storage system, at least one input apparatus, and at least one output apparatus.

Program codes for implementing the method according to the present disclosure may be written in any combination of one or more programming languages. These program codes may be provided to a processor or a controller of a general-purpose computer, a special purpose computer, or other programmable data processing apparatuses, such that the program code, when executed by the processor or the controller, causes functions/operations specified in the flowchart and/or the block diagram to be implemented. The program code may be executed entirely on a machine, partly on a machine, partly on a machine as a stand-alone software package and partly on a remote machine, or entirely on a remote machine or a server.

In the context of the present disclosure, the machine-readable medium may be a tangible medium which may contain or store a program for use by or in connection with an instruction execution system, apparatus, or device. The machine-readable medium may be a machine-readable signal medium or a machine-readable storage medium. The machine-readable medium may include, but is not limited to, an electronic, magnetic, optical, electromagnetic, infrared, or semiconductor system, apparatus, or device, or any suitable combination of the foregoing. More specific examples of the machine-readable storage medium may include an electrical connection based on one or more wires, a portable computer disk, a hard disk, a random-access memory (RAM), a read only memory (ROM), an erasable programmable read only memory (EPROM or flash memory), an optical fiber, a portable compact disc read only memory (CD-ROM), an optical storage device, a magnetic storage device, or any suitable combination of the foregoing.

To provide interaction with a user, the systems and technologies described here may be implemented on a computer having: a display apparatus (for example, a cathode ray tube (CRT) or liquid crystal display (LCD) monitor) for displaying information to a user; and a keyboard and a pointing apparatus (for example, a mouse or a trackball) by which a user may provide input for the computer. Other kinds of apparatuses may also be used to provide interaction with a user; for example, feedback provided for a user may be any form of sensory feedback (for example, visual feedback, auditory feedback, or tactile feedback); and input from a user may be received in any form (including acoustic, speech or tactile input).

The systems and technologies described here may be implemented in a computing system (for example, as a data server) which includes a back-end component, or a computing system (for example, an application server) which includes a middleware component, or a computing system (for example, a user computer having a graphical user interface or a web browser through which a user may interact with an implementation of the systems and technologies described here) which includes a front-end component, or a computing system which includes any combination of such back-end, middleware, or front-end components. The components of the system may be interconnected through any form or medium of digital data communication (for example, a communication network). Examples of the communication network include: a local area network (LAN), a wide area network (WAN) and the Internet.

A computer system may include a client and a server. Generally, the client and the server are remote from each other and interact through the communication network. The relationship between the client and the server is generated by virtue of computer programs which run on respective computers and have a client-server relationship to each other. The server may be a cloud server or a server of a distributed system, or a server incorporating a blockchain.

It should be understood that various forms of the flows shown above may be used and reordered, and steps may be added or deleted. For example, the steps described in the present disclosure may be executed in parallel, sequentially, or in different orders, which is not limited herein as long as the desired results of the technical solution disclosed in the present disclosure may be achieved.

The above-mentioned implementations are not intended to limit the scope of the present disclosure. It should be understood by those skilled in the art that various modifications, combinations, sub-combinations and substitutions may be made, depending on design requirements and other factors. Any modification, equivalent substitution and improvement made within the spirit and principle of the present disclosure all should be included in the extent of protection of the present disclosure.

What is claimed is:

1. A power load prediction method for use in a power system, implemented by a computing device, comprising:
   determining, for a current prediction time point of a prediction day, a similar day of the prediction day from historical days before the prediction day;
   acquiring an air temperature difference between an air temperature at the time point of the prediction day and an air temperature at the time point of the similar day;

determining a difference of power loads at the time point of the prediction day and the similar day according to the air temperature difference; and determining a predicted power load value at the time point of the prediction day according to a power load value at the time point of the similar day and the power load difference, wherein the determining the difference of power loads at the time point of the prediction day and the similar day according to the air temperature difference comprises:

determining the difference of the power loads at the time point of the predication day and the similar day according to the air temperature difference and a regression equation corresponding to the time point, wherein the predicted power load value is used for performing at least one of: unit starting and stopping, economic dispatch or load management in the power system.

2. The method according to claim 1, wherein the determining the similar day of the prediction day from historical days before the prediction day comprises:

using closest N historical days as candidate days, and acquiring a feature vector corresponding to the predication day and feature vectors corresponding to the candidate days, N being a positive integer greater than one; and determining Euclidean distances between the prediction day and the candidate days according to the feature vectors, ranking the candidate days in an ascending order of the Euclidean distances, and using Top K candidate days after ranking as the similar days of the prediction day, K being a positive integer and being less than N.

3. The method according to claim 2, wherein the feature vectors comprise: feature vectors generated in conjunction with predetermined M factors which influence the power load prediction result, M is a positive integer greater than one, and the air temperature is not comprised in the M factors.

4. The method according to claim 1, further comprising:

performing the following processing operations for any time point:

constructing P groups of data pairs, P being a positive integer greater than one, and any data pair comprising: a difference of air temperatures at the time point of a first historical day and a second historical day corresponding to the data pair, and a difference of power loads at the time point of the first historical day and the second historical day, and the second historical day being a similar day of the first historical day; and determining the regression equation corresponding to the time point according to the P groups of data pairs.

5. The method according to claim 4, wherein the determining the regression equation corresponding to the time point according to the P groups of data pairs comprises:

generating a corresponding scatter diagram according to the P groups of data pairs; and performing linear fitting according to the scatter diagram to obtain the regression equation corresponding to the time point.

6. The method according to claim 5, further comprising:

for the ith day in a week, $1 \leq i \leq 7$, determining a daily average power load change curve of the ith day according to daily power load change curves of L historical days, L being a positive integer greater than one, and the L historical days being all the ith days in weeks; and determining the power load value at the time point of the first historical day according to the daily average power load change curve corresponding to the first historical day, determining the power load value at the time point of the second historical day according to the daily average power load change curve corresponding to the second historical day, acquiring a difference value between the two power load values, using the difference value as week compensation corresponding to the first historical day and the second historical day, and correcting the power load difference in the data pair using the week compensation.

7. The method according to claim 6, further comprising:

acquiring week compensation corresponding to the prediction day and the similar day of the prediction day;

correcting the difference of the power loads at the time point of the prediction day and the similar day of the prediction day using the acquired week compensation; and determining the predicted power load value at the time point of the prediction day according to the power load value at the time point of the similar day of the prediction day and the corrected power load difference.

8. An electronic device, comprising:

at least one processor; and a memory connected with the at least one processor communicatively;

wherein the memory stores instructions executable by the at least one processor to enable the at least one processor to perform a power load prediction method for use in a power system comprising:

determining, for a current prediction time point of a prediction day, a similar day of the prediction day from historical days before the prediction day;

acquiring an air temperature difference between an air temperature at the time point of the prediction day and an air temperature at the time point of the similar day;

determining a difference of power loads at the time point of the prediction day and the similar day according to the air temperature difference; and determining a predicted power load value at the time point of the prediction day according to a power load value at the time point of the similar day and the power load difference, wherein the determining the difference of power loads at the time point of the prediction day and the similar day according to the air temperature difference comprises:

determining the difference of the power loads at the time point of the predication day and the similar day according to the air temperature difference and a regression equation corresponding to the time point, wherein the predicted power load value is used for performing at least one of: unit starting and stopping, economic dispatch or load management in the power system.

9. The electronic device according to claim 8, wherein the determining the similar day of the prediction day from historical days before the prediction day comprises:

using closest N historical days as candidate days, and acquiring a feature vector corresponding to the predication day and feature vectors corresponding to the candidate days, N being a positive integer greater than one; and determining Euclidean distances between the prediction day and the candidate days according to the feature vectors, ranking the candidate days in an ascending order of the Euclidean distances, and using Top K candidate days after ranking as the similar days of the prediction day, K being a positive integer and being less than N.

10. The electronic device according to claim 9, wherein the feature vectors comprise: feature vectors generated in conjunction with predetermined M factors which influence the power load prediction result, M is a positive integer greater than one, and the air temperature is not comprised in the M factors.

11. The electronic device according to claim 8, wherein the method further comprises:
  performing the following processing operations for any time point:
  constructing P groups of data pairs, P being a positive integer greater than one, and any data pair comprising: a difference of air temperatures at the time point of a first historical day and a second historical day corresponding to the data pair, and a difference of power loads at the time point of the first historical day and the second historical day, and the second historical day being a similar day of the first historical day; and
  determining the regression equation corresponding to the time point according to the P groups of data pairs.

12. The electronic device according to claim 11, wherein the determining the regression equation corresponding to the time point according to the P groups of data pairs comprises:
  generating a corresponding scatter diagram according to the P groups of data pairs; and
  performing linear fitting according to the scatter diagram to obtain the regression equation corresponding to the time point.

13. The electronic device according to claim 11, wherein the method further comprises:
  for the ith day in a week, 1≤i≤7, determining a daily average power load change curve of the ith day according to daily power load change curves of L historical days, L being a positive integer greater than one, and the L historical days being all the ith days in weeks; and
  determining the power load value at the time point of the first historical day according to the daily average power load change curve corresponding to the first historical day, determining the power load value at the time point of the second historical day according to the daily average power load change curve corresponding to the second historical day, acquiring a difference value between the two power load values, using the difference value as week compensation corresponding to the first historical day and the second historical day, and correcting the power load difference in the data pair using the week compensation.

14. The electronic device according to claim 13, wherein the method further comprises:
  acquiring week compensation corresponding to the prediction day and the similar day of the prediction day;
  correcting the difference of the power loads at the time point of the prediction day and the similar day of the prediction day using the acquired week compensation; and determining the predicted power load value at the time point of the prediction day according to the power load value at the time point of the similar day of the prediction day and the corrected power load difference.

15. A non-transitory computer readable storage medium storing computer instructions for causing a computer to perform a power load prediction method for use in a power system comprising:
  determining, for a current prediction time point of a prediction day, a similar day of the prediction day from historical days before the prediction day;
  acquiring an air temperature difference between an air temperature at the time point of the prediction day and an air temperature at the time point of the similar day;
  determining a difference of power loads at the time point of the prediction day and the similar day according to the air temperature difference; and
  determining a predicted power load value at the time point of the prediction day according to a power load value at the time point of the similar day and the power load difference,
  wherein the determining the difference of power loads at the time point of the prediction day and the similar day according to the air temperature difference comprises:
  determining the difference of the power loads at the time point of the predication day and the similar day according to the air temperature difference and a regression equation corresponding to the time point,
  wherein the predicted power load value is used for performing at least one of: unit starting and stopping, economic dispatch or load management in the power system.

16. The non-transitory computer readable storage medium according to claim 15, wherein the determining the similar day of the prediction day from historical days before the prediction day comprises:
  using closest N historical days as candidate days, and acquiring a feature vector corresponding to the predication day and feature vectors corresponding to the candidate days, N being a positive integer greater than one; and
  determining Euclidean distances between the prediction day and the candidate days according to the feature vectors, ranking the candidate days in an ascending order of the Euclidean distances, and using Top K candidate days after ranking as the similar days of the prediction day, K being a positive integer and being less than N.

17. The non-transitory computer readable storage medium according to claim 16, wherein the feature vectors comprise: feature vectors generated in conjunction with predetermined M factors which influence the power load prediction result, M is a positive integer greater than one, and the air temperature is not comprised in the M factors.

* * * * *